May 11, 1954  L. C. BEARD, JR  2,678,132
ENDLESS BELT ABSORPTION
Filed March 31, 1950  3 Sheets-Sheet 1

LESLIE C. BEARD, JR.
INVENTOR.

BY Raymond W. Barclay

ATTORNEY

May 11, 1954 — L. C. BEARD, JR — 2,678,132
ENDLESS BELT ABSORPTION
Filed March 31, 1950 — 3 Sheets-Sheet 2

LESLIE C. BEARD, JR.
*INVENTOR.*

BY Raymond W. Barclay

ATTORNEY

May 11, 1954  L. C. BEARD, JR  2,678,132
ENDLESS BELT ABSORPTION
Filed March 31, 1950  3 Sheets-Sheet 3

LESLIE C. BEARD, JR.
*INVENTOR.*

BY Raymond W. Barclay

ATTORNEY

Patented May 11, 1954

2,678,132

UNITED STATES PATENT OFFICE 2,678,132

ENDLESS BELT ADSORPTION

Leslie C. Beard, Jr., New York, N. Y., assignor to Socony-Vacuum Oil Company, Incorporated, a corporation of New York Application March 31, 1950, Serial No. 153,154

8 Claims. (Cl. 210—42.5)

This invention relates to a continuous chromatographic adsorption method and apparatus for resolving liquid mixtures and recovering valuable components therefrom. More particularly, the present invention is concerned with a process and apparatus for effecting separation, recovery and purification of the components of liquid mixtures according to chemical type by selective adsorption of one or more of said components on a continuously moving band of flexible sorbent material and subsequent continuous desorption of the sorbed components from the pores of the moving sorbent band, thereby permitting continuous regeneration thereof.

The technique of separating the components of complex mixtures based on the partition of solutes between a stationary solid adsorbent and a moving liquid phase is well known. This technique, first brought to notice by Tswett, was originally used to separate colored components from their solution and accordingly was designated as chromatographic adsorption. Although the method is no longer restricted to colored materials, the name has remained. The usual procedure heretofore employed for effecting chromatographic adsorption has involved passage of a liquid mixture to be treated through a column of granular adsorbent. Then, since a given adsorbent material possesses a different affinity for various substances, the individual components of the mixture become separated and concenterated in zones throughout the column of adsorbent, from which they are subsequently removed by solvent extraction.

While the foregoing procedure has afforded a useful means for separating complex mixtures on a small scale, as in analytical processes and the like, such method has not been economically attractive for large scale operations. With the increased use and ascending importance of chromatographic adsorption in a multitude of industries, the need has arisen for a more efficient continuous process. The method and apparatus of the present invention contemplate fulfillment of this need. In general, a continuous operation offers many advantages over a batch process. In a batch process, the desired separation must either cease during regeneration of the adsorbent or a number of units must necessarily be employed, some being worked while others undergo regeneration. The labor required per volume of charge, the equipment necessary, the time consumed per volume of charge and consequently the operational expenses are in general considerably greater in batch processes than in a continuous cyclic process.

It is accordingly an object of this invention to provide a continuous chromatographic adsorption process for effecting resolution of liquid mixtures. Another object of this invention is the provision of an apparatus for expediting the separation of liquid mixture components in a continuous manner. A further object is to provide a continuous chromatographic adsorption method capable of being applied economically to the separation of complex liquid mixtures. A still further object is the provision of a commercially attractive cyclic operation for resolving a liquid mixture into its components by stepwise continuous chromatographic adsorption and elutriation. A very important object is the provision of equipment for effecting such continuous separation.

These and other objects, which will be apparent to those skilled in the art, are achieved in accordance with the instant invention wherein an apparatus and a process are provided for effecting separation of complex liquid mixtures by selective adsorption of various components thereof on a continuously moving adsorbent belt from which the sorbed components are continuously desorbed with an elutriant, or a series of elutriants, followed by drying the adsorbent belt and recycling the same to further contact with the mixture undergoing treatment.

This invention will be readily understood by reference to the attached drawings.

Figure 1 of the drawings is a schematic diagram illustrating one embodiment of the invention wherein a complex mixture is fed onto a countercurrently moving adsorbent belt, thereby effecting separation of the mixture into sorbed and unsorbed components and subsequently recovering the sorbed components by passing said belt through an elutriating zone.

Figure 1:
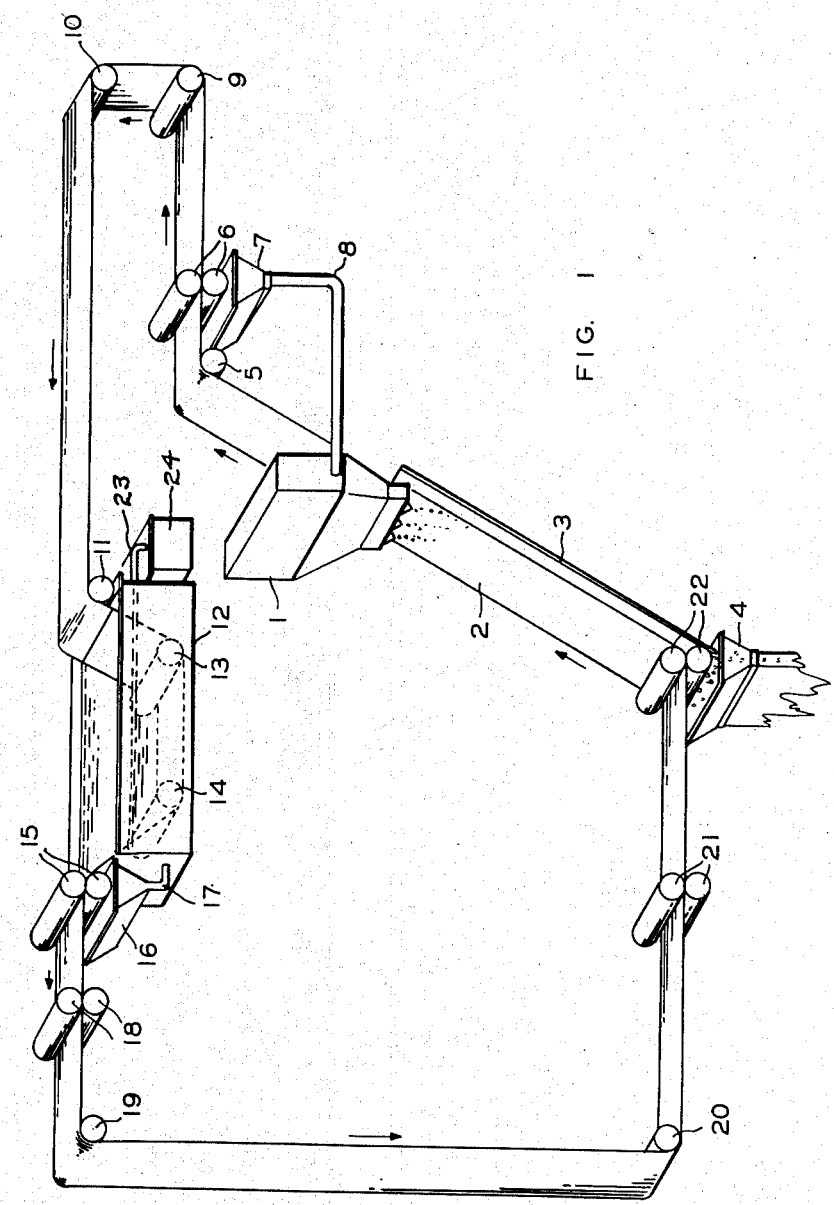

Referring more particularly to Figure 1, it will be seen that the liquid mixture to be treated is conducted from feed tank 1 onto an inclined continuously moving adsorbent belt 2. The liquid flows down and countercurrent to the inclined moving belt and components thereof capable of being sorbed by the adsorbent are removed while unsorbed components pass through the flexible adsorbent belt, flow down an inclined catch pan 3 directly beneath the inclined adsorbent belt and into a trough 4. Liquid components not sorbed also flow down the surface of the adsorbent belt, collect at the lower end of the inclined belt and spill over into trough 4.

The adsorbent belt containing sorbed components passes over guide roll 5 and through pressure rolls 6, at which point, excess unsorbed liquid adhering to the surface of the belt is squeezed out, caught in trough 7 and recycled via conduit 8 to feed tank 1. The moving belt with sorbed components then passes over guide rolls 9 and 10, is led over roll 11 into desorbing tank 12 containing an elutriant capable of removing sorbed components from the pores of the adsorbent belt. The moving belt passes through the desorbing tank guided by rolls 13 and 14 submerged beneath the liquid level of the elutriant. The belt, upon emersion from the desorbing tank, passes between pressure rolls 15, removing excess adhering elutriating agent which drops into trough 16 and is returned to desorbing tank 12 through conduit 17. The moving belt passes on between drying rolls 18, which are either steam or internally gas flame-heated to remove remaining elutriating agent and thus complete the revivification of the adsorbent. The belt then passes over guide roll 19, is conducted downward, passing over roll 20 and then fed through drying rolls 21, and finally through rolls 22, where it is again contacted with liquid mixture and the cycle is repeated. Desorbed matter floating on the surface of the liquid elutriant in tank 12 is removed through pipe 23 and passes into tank 24. The completeness of separation of the components of the particular liquid mixture under treatment will depend on the relative rates at which the feed liquid and the moving adsorbent belt are brought into contact as well as on the specific adsorbent chosen and other variables as described in detail hereinafter.

Figure 2:
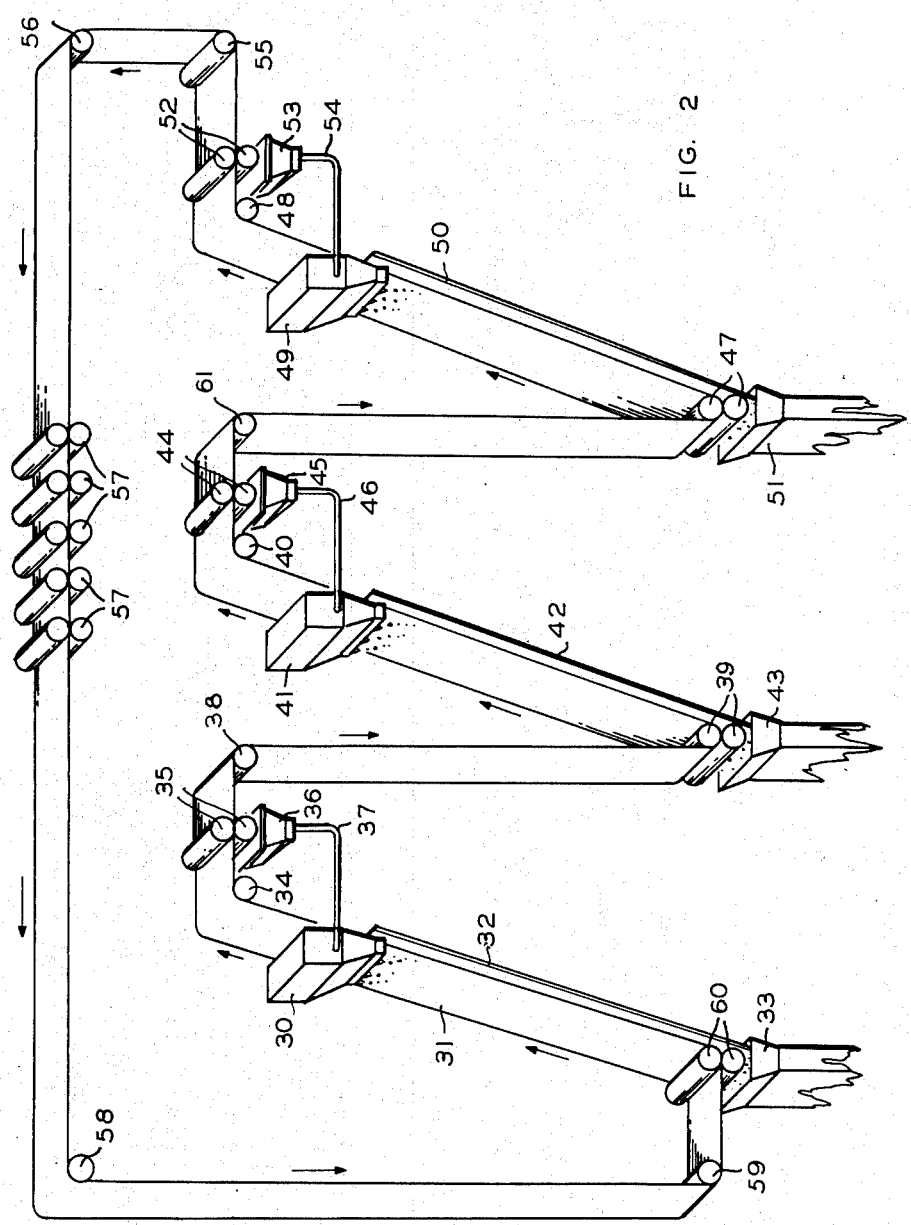
Figure 2 is a schematic diagram illustrating continuous stepwise separation of a complex mixture employing a cyclic chromatographic adsorption operation.

Figure 2 shows a stepwise continuous chromatographic adsorption system. In this operation, a liquid mixture containing a multiple of components passes from feed tank 30 onto an inclined adsorbent belt 31 continuously moving countercurrent to the flow of said mixture. The liquid flows down the inclined moving belt, the speed of which is controlled by means not shown to permit adequate contact time between the adsorbent surface and the mixture. Sorption of components capable of being taken up by the moving belt are thus removed from the mixture. Remaining unsorbed components either pass through the flexible adsorbent belt onto catch pan 32 where they flow down into trough 33 or collect at the lower end of the inclined belt and spill over into trough 33.

The moving belt with sorbed components passes upward over guide roll 34 and through pressure rolls 35 where excess unsorbed liquid adhering to the surface of the belt is removed, dropping into trough 36 and being recycled to feed tank 30 through conduit 37. The moving belt, freed of adhering surface liquid, and containing sorbed components passes on over guide roll 38 and is then conducted downward through rolls 39 and again up an incline to roll 40. As the inclined moving belt passes from rolls 39 to roll 40, a primary elutriant for a portion of the sorbed components contained in the pores of the adsorbent belt flows from feed tank 41 downwardly countercurrent to the movement of the belt, selectively extracting a certain fraction of sorbed components from the adsorbent. The elutriant containing the components so removed either passes through the flexible adsorbent belt onto catch pan 42 and then into trough 43 or collects at the lower end of the inclined belt and flows over into trough 43. The solution of primary elutriant and extracted components may thereafter be separated by distillation or any other suitable means.

The moving belt wet with primary elutriant and still containing sorbed components unaffected by said elutriant passes over guide roll 40 and through pressure rolls 44 where excess primary elutriant adhering to the surface of the belt is squeezed out, caught in trough 45 and recycled to tank 41 through conduit 46. The belt then passes over guide roll 61 and is conducted downward through rolls 47 and again up an incline to roll 48. As the inclined moving belt passes from rolls 47 to roll 48, a secondary elutriant for components present in the adsorbent flows from feed tank 49 downwardly countercurrent to the movement of the belt, selectively extracting sorbed components from the adsorbent. The secondary elutriant containing components so removed passes through the flexible adsorbent belt onto catch pan 50 and then into trough 51. A certain amount of the secondary elutriant containing components removed from the adsorbent also flows down the surface of the adsorbent belt, collects at the lower end of the inclined belt and spills over in trough 51. The solution of secondary elutriant and extracted components may thereafter be separated by distillation or other feasible means.

The adsorbent belt passes over guide roll 48 and through pressure rolls 52 where excess secondary elutriant adhering to the surface of the belt is squeezed out, caught in trough 53 and recycled to tank 49 through conduit 54. The moving belt then passes over guide rolls 55 and 56 and is led through a series of drying rolls 57, the temperature preferably being gradually increased as the belt passes therethrough to avoid disintegration of the adsorbent. The dried adsorbent belt freed of sorbed components and elutriants is now ready for recycling. The belt accordingly moves over guide roll 58, passing downwardly to roll 59 and is then fed through rolls 60 where it is again contacted with liquid mixture and the cycle is repeated.

It will, of course, be understood that while three inclined adsorbent bands are illustrated by the system of Figure 2, the present invention contemplates the similar use of any suitable number of inclines depending on the complexity of the liquid mixture under treatment and on the number of components which it is desired to separate from said mixture. In place of separate inclines for the introduction of elutriating agents, the moving belt containing sorbed components may be passed through a desired number of desorbing tanks, such as the one shown in Figure 1, each of which contains a different solvent capable of removing a component or a class of components previously sorbed into the pores of the absorbent belt.

The nature of the particular adsorbent employed in the present invention depends largely on the type of mixture undergoing treatment. In general, once the type of feed mixture has been established, an adsorbent is chosen which affords maximum separation or removal of the desired components from the mixture. While nearly all solids show some adsorptive power, such power is ordinarily not of sufficient magnitude to be useful unless the adsorbent has a very large surface area per unit volume. A large surface area is generally realized by employing a material of porous structure. Other factors of importance influencing the choice of adsorbent are pore size, ionic lattice, and Van der Waal's forces. Typical adsorbents for use in the present process include materials such as bauxite, silica gel, calcium oxide, magnesium oxide, fibrous alumina, synthetic ion exchange resins, naturally occurring zeolites, activated carbon, charcoal, and the like. The foregoing represent adsorbents suitable for use in impregnation of flat flexible material possessing little or no adsorptive power for treating the particular liquid mixture under consideration. Thus, textiles, papers, glass fabrics and the like impregnated with an adsorbent may be used in the present procedure. Also, it is contemplated that papers of high wet strength, particularly those which have not been sized, and textiles of a porous nature, such as certain linens and the like, may be employed directly without the need for impregnation. As emphasized hereinabove, the particular adsorbent chosen will depend largely on the character of the feed mixture. It is thus within the purview of this invention to employ a flat flexible adsorbent material which may be either naturally sorbent or impregnated with suitable adsorbent. In those instances where a base material impregnated with an adsorbent is used, the base may be any suitable flat flexible material to which the adsorbent is capable of adhering. Thus, glass fiber, textiles, a variety of papers, very thin metallic screens, etc., may be used as suitable base materials for deposition thereon of adsorbents. It is also contemplated that the adsorbent may be contained, in sandwich form, between two sheets of fabric or other porous material which is thereafter "stitched" into segments like a quilt to provide substantial immobility of adsorbent without loss of flexibility.

The apparatus and process described herein for continuous chromatographic adsorption is capable of wide application. Thus, it is contemplated that the present invention may be used in such widely diverse fields as the purification of water, separation of carotenoids, extraction of vitamins and hormones, concentration of isotopes, separation of the rare earths, concentration of quinine from solution, purification of streptomycin and other valuable pharmaceuticals, removal of color bodies from lubricating oils, crude sugar solutions and the like, separation of mixtures of fatty acids, fractionation of petroleum into various class compounds, resolution of cis and trans isomers, and in treatment of numerous other liquid mixtures containing two or more components. The sorbed fraction, moreover, may represent either a valuable component present in the mixture or an impurity which it is desired to remove from the mixture. The degree of adsorption is generally influenced by the molecular structure of different compounds. For example, silica gel and similar adsorbents selectively sorb components of complex organic mixtures in the following order:

1. Polar compounds, such as alcohols, ethers, phenols, aldehydes, acids, etc.
2. Aromatics
3. Olefins
4. Naphthenes
5. Paraffins Accordingly, a hydrocarbon mixture of aromatics and paraffins may be continuously separated in accordance with the instant process by sorption of the aromatic components on a continuously moving belt impregnated with silica gel while the paraffinic components remain unsorbed. Of course, if the paraffinic components were to remain in contact with the adsorbent belt over an extended period of time, some would likewise be sorbed by the silica gel adsorbent. By regulation of the speed of the moving belt, however, a substantially complete fractionation of sorbed aromatic and unsorbed paraffinic components can be achieved. In this particular case, the speed of the moving belt would be such as to remain in contact with the feed mixture for a sufficient time to sorb the aromatic components but for a period insufficient to permit appreciable sorption of the paraffinic components. An indication of the rate at which the moving adsorbent belt should process to effect desired maximum separation can be obtained by reference to the adsorption isotherm of the component undergoing adsorption. Thus, for a simple two-component system, such as a mixture of paraffins and aromatics to be separated with a given adsorbent, for example, a moving belt of silica gel, the adsorption isotherm of the aromatic components may be readily determined. It is only necessary to ascertain the volume of aromatics adsorbed (in cc. per gram of adsorbent) from various concentrations of aromatic components in a mixture of paraffins and aromatics. The relation of volume of aromatics adsorbed to concentration of aromatics in the mixture is the adsorption isotherm. Once knowing the adsorption isotherm for a given system, and the weight of adsorbent contained on a unit length of the moving belt, the rate at which said belt should move to effect substantially complete adsorption of the aromatics without any appreciable adsorption of the paraffinic components can be determined. The rate of flow of liquid mixture down the inclined moving adsorbent belt is further influenced by the pitch of the particular adsorbent incline employed. By correlation of the rate of movement of the inclined adsorbent belt, taking into account the pitch thereof, with the nature of the mixture undergoing treatment, maximum separation of desired components with a given adsorbent may thus be realized. As a practical matter, the separation of a two-component mixture made up of components having different adsorption characteristics is readily accomplished employing the system shown in Figure 1. For a more complex mixture, containing three or more components, a system such as shown in Figure 2 is generally more useful.

The elutriant employed in removing sorbed components from the moving belt should have certain specified characteristics. Thus, the elutriant and the sorbed component to be released should be so related with respect to boiling point that they made be easily separated from each other by distillation. The particular elutriant chosen should also be capable of accomplishing desorption at a sufficiently rapid rate so that excessively long time of contact between the adsorbent belt and the elutriant is avoided. In order to effect rapid desorption it is generally necessary that the elutriant employed be at least partially miscible with the sorbed components to thereby permit easy penetration of the surface of the adsorbent. In addition to the above, the elutriant used in the present process should be a material which is reasonable in price and readily available. The particular elutriant used will, of course, depend on the nature of the sorbed components which it is desired to remove. As a general rule, a substance which is more readily adsorbed than the material already contained in the pores of the adsorbent may be used as a suitable elutriant. Thus, if it is desired to remove aromatic components from the pores of the adsorbent belt, an alcohol may be employed as the elutriant. Ordinarily, for removal of organic compounds, polar solvents which possess a high adsorption affinity will be used. Thus, ethers, such as ethyl ether; ketones, such as acetone and methyl ethyl ketone; alcohols, such as methanol and ethanol; and halogenated paraffins, such as chloroform and carbon tetrachloride, may be employed as suitable elutriating agents. In some cases, water may serve as an effective elutriant. Also, aqueous solutions of various salts find use as elutriating agents. Thus, where this invention is used for purification of water employing an adsorbent which is zeolitic in nature, such zeolitic adsorbent may be revivified by passage of the same through an elutriating bath of aqueous sodium chloride solution. It is thus only necessary in choosing an elutriant that it be such as to rapidly displace the sorbed components from the moving adsorbent belt and to desirably having a boiling point remote from that of the components so released so as to permit subsequent easy separation of the elutriant and released components.

After removal of the sorbed constituents from the moving adsorbent belt, excess elutriating agent is pressed therefrom and the belt is then heated to remove remaining elutriant and to thus revivify the adsorbent. It is generally preferable to heat the adsorbent belt to a temperature sufficient to drive off any elutriating agent contained in the pores thereof. Excessively high temperatures, however, should in general be avoided to obviate any disintegration of the adsorbent.

Figure 3:
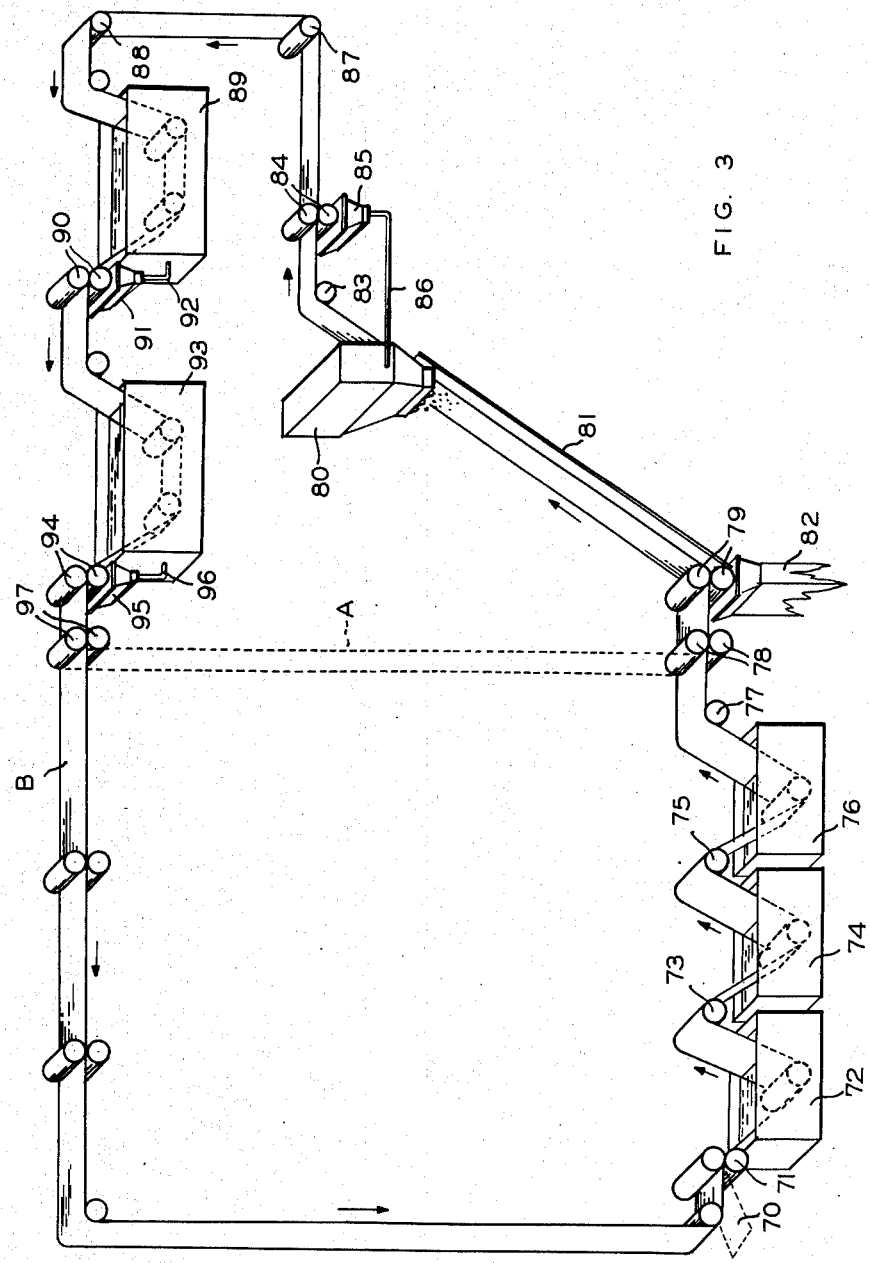
Figure 3 represents a particular embodiment of the invention, wherein a moving belt of silica gel adsorbent embedded in a flexible base is employed to continuously separate a complex liquid mixture by chromatographic adsorption.

In those instances where a flexible base material impregnated with adsorbent is used, the impregnation may be accomplished by any feasible method. Such impregnation processes are well known and need not be described herein. In some cases, however, it may be desirable to continuously impregnate the flexible base material with a minute layer of adsorbent. A suitable system for effecting such continuous operation is shown in Figure 3. Referring more particularly to this figure, it will be seen that a fabric belt 70 is passed over guide roll 71 into a bath of sodium silicate 72, emerges from this bath, passing over roll 73 and then into an acidic bath 74 which may be an aqueous solution of hydrochloric, sulfuric or other readily available acid. The passage of the fabric containing sodium silicate through the acidic bath, as indicated, provides a silica gel impregnated fabric. This fabric emerges from the acidic bath, passes over roll 75 and then into a washing bath 76, which may be either water or an aqueous salt solution designed for base-exchanging the silica gel. The washed impregnated fabric then passes over guide roll 77 and through heating rolls 78, where it is dried. The silica gel impregnated fabric is then conducted through rolls 79, passing up an incline, where it comes in contact with the liquid mixture to be treated, for example, a hydrocarbon mixture of paraffins, naphthenes, and aromatics. The liquid hydrocarbon mixture is fed onto the moving silica gel belt from tank 80. The liquid flows down and countercurrent to the movement of the belt. The speed of the belt is regulated by means not shown to effect sorption of the naphthenic and aromatic components of the mixture while the paraffinic components remain substantially unsorbed. The paraffins present in the mixture thus flow through and down the moving belt. The portion which passes through the belt is caught by a pan 81 and combined with that portion removed at the bottom of the incline. The paraffinic components so separated pass into trough 82.

The silica gel impregnated belt containing sorbed naphthenes and aromatics passes over guide roll 83 and through pressure rolls 84, where any unsorbed liquid adhering to the surface of the belt is squeezed out, caught in trough 85 and recycled through conduit 86 to feed tank 80. The belt then passes over rolls 87 and 88 into an elutriating bath 89 of benzene, where naphthenes sorbed on the moving silica gel belt are substantially removed. The belt, upon emersion from the benzene bath, passes between pressure rolls 90, removing excess adhering benzene which drops into trough 91 and is returned to the bath 89 through conduit 92. The moving belt, now containing sorbed aromatic components, is conducted into a second elutriating bath 93 of polar solvent, such as acetone, methanol, etc. This bath serves to desorb aromatics from the adsorbent belt which, after emersion from the bath, passes through pressure rolls 94, removing any excess adhering polar solvent which drops into trough 95 and then is recycled to the bath through conduit 96. The belt is then passed through drying rolls 97 and may thereafter, by means not illustrated, either be returned via path A to rolls 78 or be recycled through a series of guide rolls via path B to the impregnation baths 72 and 74. In either case, the adsorbent belt is again contacted with hydrocarbon mixture and the cycle repeated any feasible number of times commensurate with the extent of separation desired. Generally, it is unnecessary to reimpregnate the fabric during each cycle, since a single impregnation will ordinarily serve for several cyclic operations. The sodium silicate employed for impregnation under the above circumstances is a dilute aqueous solution since it is only necessary to deposit a very thin adsorbent layer on the fabric base and such thin layer, which becomes embedded in the fibers of the fabric, is in fact to be desired since the flexibility of the moving belt is thereby retained. The benzene solution of naphthenes in bath 89 and the polar solvent solution of aromatics in bath 93 may be separated by distillation or other feasible means and the elutriating agents recycled to the respective baths.

While the nature of this invention has been set forth in considerable detail hereinabove, it will be understood that the invention in its broader aspects is not limited thereto but includes numerous modifications and variations of continuous chromatographic adsorption falling within the scope of the appended claims.

I claim:

1. An apparatus for continuous adsorption comprising, in combination, an endless flexible adsorbent belt, means for continuously moving said belt up an incline, means near the upper part of said incline for continuously flowing liquid feed mixture down the moving inclined belt, means near the lower part of said incline for continuously removing the unsorbed portion of said liquid feed, means beyond said incline for continuously conducting the moving belt with the sorbed portion of said liquid feed through an elutriating zone, means for continuously drying the moving belt upon emersion from said elutriating zone and means for continuously recycling the revivified adsorbent belt to further contact with liquid feed mixture.

2. An apparatus for continuous adsorption comprising, in combination, an endless flexible adsorbent belt, means for continuously moving said belt up an incline, a feeding chamber near the upper part of said incline for continuously flowing liquid mixture down the moving inclined belt, a receptacle near the lower part of said incline for continuously receiving the unsorbed portion of said liquid mixture, pressure rolls beyond said incline for continuously squeezing adhering liquid from the surface of said moving belt, means for recycling the expressed liquid to the feeding chamber, means for continuously conducting the moving belt substantially freed of adhering surface liquid but containing the sorbed portion of said liquid mixture through an elutriating zone wherein said sorbed portion is continuously removed from said belt, heated rolls for continuously drying the moving belt upon emersion from said elutriating zone and means for continuously recycling the dried, revivified belt to further contact with the liquid mixture.

3. An apparatus for continuous adsorption comprising, in combination, an endless flexible adsorbent belt, means for continuously moving said belt up and down a series of inclines, means near the upper part of the first of said inclines for continuously flowing liquid feed mixture down the moving belt, means near the lower part of said first incline for continuously removing the unsorbed portion of said liquid feed, means near the upper part of each of the subsequent inclines for continuously flowing an elutriating agent down the inclined moving belt, means near the lower part of each of said subsequent inclines for continuously removing said elutriating agent containing a fraction of the portion of said liquid feed initially sorbed by said belt, means beyond said inclines for continuously pressing and drying the moving belt and means for continuously recycling the revivified adsorbent belt to further contact with liquid feed mixture.

4. An apparatus for continuous adsorption comprising, in combination, an endless flexible adsorbent belt, means for continuously moving said belt up and down a series of inclines, a feeding chamber near the upper part of the first of said inclines for continuously flowing liquid mixture down the moving belt, a receptacle near the lower part of said first incline for continuously receiving the unsorbed portion of said liquid mixture, pressure rolls intermediate the first and second inclines for continuously squeezing adhering liquid from said moving belt, means for recycling the expressed liquid to said feeding chamber, means near the upper part of each of the subsequent inclines for continuously flowing an elutriating agent down the inclined moving belt, receptacles near the lower part of each of said subsequent inclines for continuously receiving said elutriating agent containing a fraction of the portion of said liquid mixture initially sorbed by said belt, pressure rolls intermediate each of said subsequent inclines for continuously squeezing adhering elutriating agent from said moving belt, means for continuously recycling the expressed elutriating agent, means beyond said series of inclines for continuously pressing and drying the moving belt and rolls for continuously recycling the revivified adsorbent belt to further contact with the liquid mixture.

5. An apparatus for continuous adsorption comprising, in combination, an endless flexible adsorbent belt, means for continuously moving said belt up an incline, means near the upper part of said incline for continuously flowing liquid feed mixture down the moving belt, means near the lower part of said incline for continuously removing the unsorbed portion of said liquid feed, a series of elutriating baths beyond said incline through which the moving belt is conducted, means for continuously drying the moving belt upon emersion from said elutriating baths and means for continuously recycling the revivified adsorbent belt to further contact with liquid feed mixture.

6. A process for continuously separating by adsorption a liquid mixture composed of at least two components having different adsorption characteristics with respect to a given adsorbent, comprising continuously feeding a stream of said liquid mixture onto a continuously moving flexible belt of adsorbent, adsorbing at least a portion of said feed mixture into the pores of said moving belt, continuously passing the moving belt containing sorbed components through an elutriating zone wherein desorption of said sorbed components takes place, continuously conducting the desorbed adsorbent belt through a drying zone and continuously recycling the revivified belt to further contact with said liquid mixture.

7. A process for continuously separating by adsorption a liquid mixture composed of at least two components having different adsorption characteristics with respect to a given adsorbent, comprising continuously flowing a stream of said liquid mixture down an inclined upwardly moving flexible belt of adsorbent, continuously removing the components of said mixture unsorbed by said belt at the lower inclined portion thereof, continuously removing excess unsorbed liquid adhering to the surface of said belt, continuously combining said removed liquid with the original feed mixture, continuously passing the belt with sorbed components of said mixture through an elutriating zone wherein said sorbed components are continuously removed from said belt, continuously passing the desorbed belt through a drying zone and continuously recycling the adsorbent belt so revivified to further contact with said liquid mixture.

8. A process for continuously resolving a multi-component liquid mixture, the components of which have different adsorption characteristics with respect to a given adsorbent, which comprises continuously contacting a stream of said liquid mixture with a countercurrently moving endless flexible adsorbent belt, thereby effecting a separation of said mixture into sorbed and unsorbed components, continuously removing unsorbed components from further contact with said belt, continuously passing said belt with sorbed components through a series of elutriating zones wherein at least one of said sorbed components is removed in each of said zones from the pores of said adsorbent belt, continuously drying the belt after completing elutriation thereof and continuously recycling the dried revivified adsorbent belt to further contact with a stream of the foregoing liquid mixture.

(References on following page)

References Cited in the file of this patent

UNITED STATES PATENTS

| Number | Name | Date |
|---|---|---|
| 802,754 | Hall | Oct. 24, 1905 |
| 1,408,279 | Ewald | Feb. 28, 1922 |
| 1,686,094 | Manning | Oct. 2, 1928 |
| 1,754,599 | Bollman | Apr. 15, 1930 |
| 1,794,039 | Silvano et al. | Feb. 24, 1931 |
| 2,166,266 | Schmitt | July 18, 1939 |
| 2,222,828 | Guthrie | Nov. 28, 1940 |
| 2,253,755 | Brant | Aug. 26, 1941 |
| 2,331,521 | Utterback | Oct. 12, 1943 |
| 2,370,138 | Bonatto | Feb. 27, 1945 |
| 2,389,378 | Marisic | Nov. 20, 1945 |
| 2,592,403 | Evans | Apr. 8, 1952 |

FOREIGN PATENTS

| Number | Country | Date |
|---|---|---|
| 585,224 | Great Britain | Feb. 3, 1947 |
| 611,080 | Great Britain | Oct. 25, 1948 |